United States Patent Office 3,014,242
Patented Dec. 26, 1961

3,014,242
PLASTIC INJECTION MOLDING MACHINES
Willard L. Baker, Ipswich, and Raymond L. Peterson and Frank W. Spencer, Beverly, Mass., assignors to United Shoe Machinery Corporation, Flemington, N.J., a corporation of New Jersey
Filed May 19, 1960, Ser. No. 30,146
1 Claim. (Cl. 18—30)

This invention relates to plastic injection molding machines and is herein illustrated in its application to machines for molding shoe soles, in situ, onto the bottoms of lasted shoes. Machines of this type are disclosed, for example, in United States Letters Patent No. 2,937,405, granted May 24, 1960, in the names of Loring J. Berggren et al., and in an application for United States Letters Patent Serial No. 753,228, filed August 5, 1958, in the names of Willard L. Baker et al. While the invention is herein illustrated in its application to machines for molding outsoles onto shoe bottoms, it is to be understood that the invention is not limited in its scope to machines of this type but is applicable as well to other types of plastic injection molding machines.

It is an object of the present invention to provide in a plastic injection molding machine an improved means for terminating the plastic injecting operation after the mold cavity has been fully charged.

The machine illustrated in the drawings is provided with an injection nozzle of known construction and a gate valve for opening and closing the nozzle. A suitable fluid pressure operated switch is provided for causing the gate valve to close. In order to time the operation of the switch to occur immediately after the mold cavity is fully charged, the present invention contemplates the provision of a bleeder system communicating with the pressure line whereby the switch is operated, said bleeder system including interconnecting conduits formed in and extending through the two mold members. Immediately after the mold cavity has been fully charged the bleeder system is obstructed by fluid plastic injected from the mold cavity into said interconnecting conduits through a suitable passage provided therefor in the mold members. By obstructing the flow of fluid through said conduits the degree of pressure in the fluid pressure line for operating the gate valve switch is built up sufficiently to cause the operation of the switch and the consequent closing of the gate valve. The mold members in which the conduits are provided have mutually engaging parting faces providing an interconnection between the conduits and said conduits are enlarged at their interconnection to provide a chamber which communicates with the mold cavity through a passage formed between the parting faces of the mold members. The conduit on the egress side of the chamber is made large enough to permit free flow of fluid plastic therethrough thus to obviate build-up of pressure in the mold cavity during the brief interval between the charging of the mold cavity and the closure of the nozzle valve.

The invention will now be described with reference to the accompanying drawings and pointed out in the appended claim.

The invention, as herein illustrated and described, is embodied in a machine for molding soles, in situ, onto the bottoms of lasted shoe uppers, and more particularly to machines for molding soles onto shoe bottoms by the injection of fluid plastic into a sole-shaped mold cavity provided by a bottom mold member having a contour defining the tread face of a sole and two side mold members defining the peripheral contour of the sole, said side mold members being constructed and arranged to close against the edge face of the bottom mold member. To complete the closure of the mold cavity the side mold members have secured thereto welt plates, so called, the inner edges of which engage and slightly impress the feather line portion of the upper as the side mold members complete their closing movement. For mounting a lasted shoe upper, machines of this type are commonly provided with shoe forms, usually made of metal, and means for mounting a shoe form for swinging movement to and from a position in which it is arranged for the molding of a sole onto a lasted shoe upper mounted thereon.

Machines of the type, illustrated in the Baker et al. application, above referred to, are characterized by a conveyor system mounting a plurality of ambulatory assemblies each having a shoe form and sole mold members of the type above described. Such machines are provided with automatic means for operating the conveyor system step-by-step to advance a lasted shoe upper from a loading station to a molding station and thence through a series of steps back to the loading station where the shoe, onto which a sole is now molded, is removed from the shoe form, and a lasted shoe, onto which a sole is to be molded, is mounted on the form. At the injection station means is provided for swinging the ambulatory assembly in a direction heightwise of the shoe on the form thereby to bring a sprue member projecting from the bottom mold member into contact with a nozzle through which fluid plastic is injected into the mold cavity. Movement of the ambulatory assembly heightwise of the lasted upper on the shoe form closes a limit switch thus to cause the operation of a plastic injecting piston and concomitantly to cause the opening of a gate valve to permit plastic to flow through the nozzle and into the mold cavity. Upon the completion of the charging of the mold cavity the operation of the plastic injecting piston and the closing of the gate valve are effected by the operation of mechanism hereinafter described.

Figure 1:
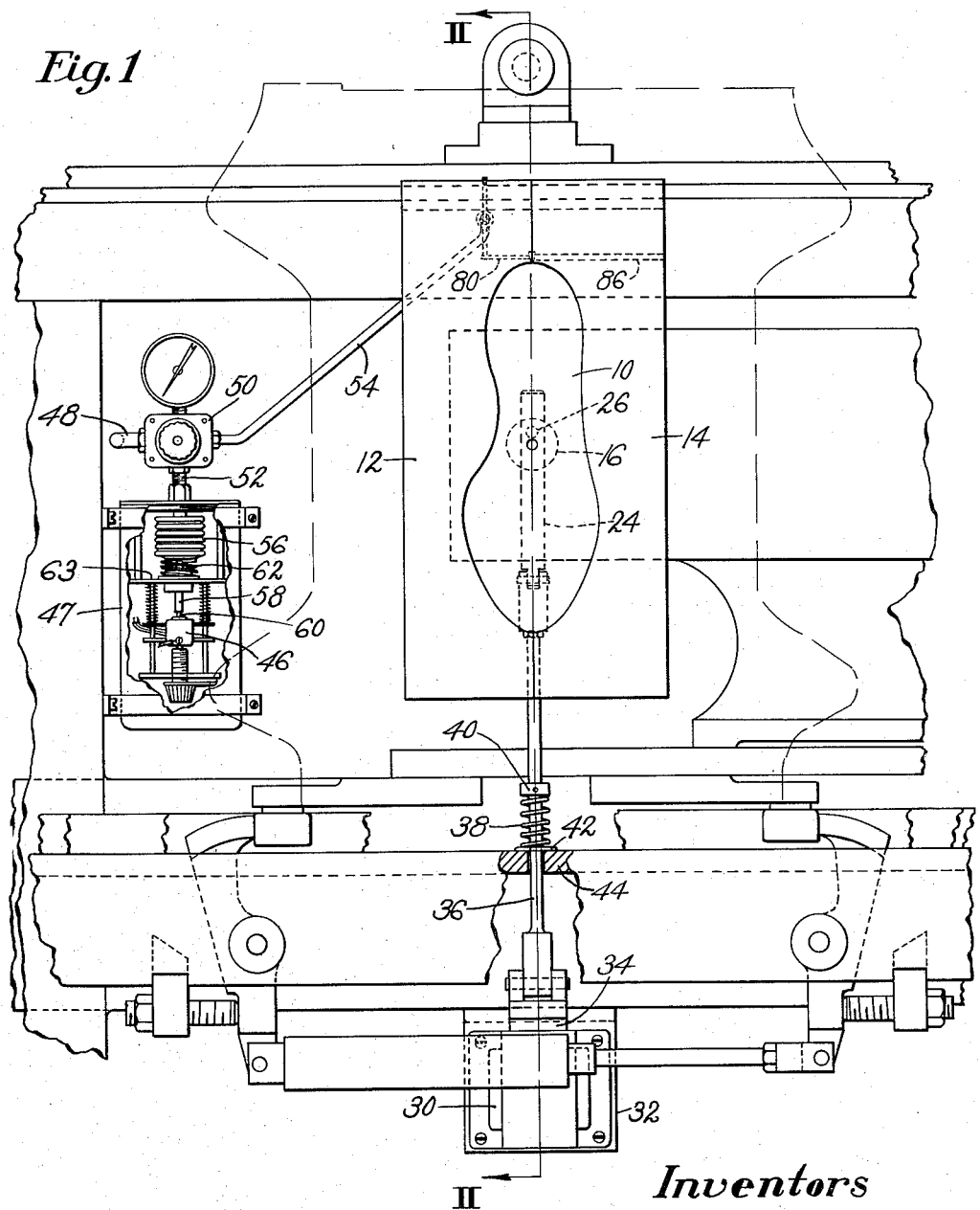
FIG. 1 is a front elevation illustrating a portion of a machine embodying the features of the present invention, certain parts being shown in section and other parts being broken away to disclose hidden elements.
Figure 2:
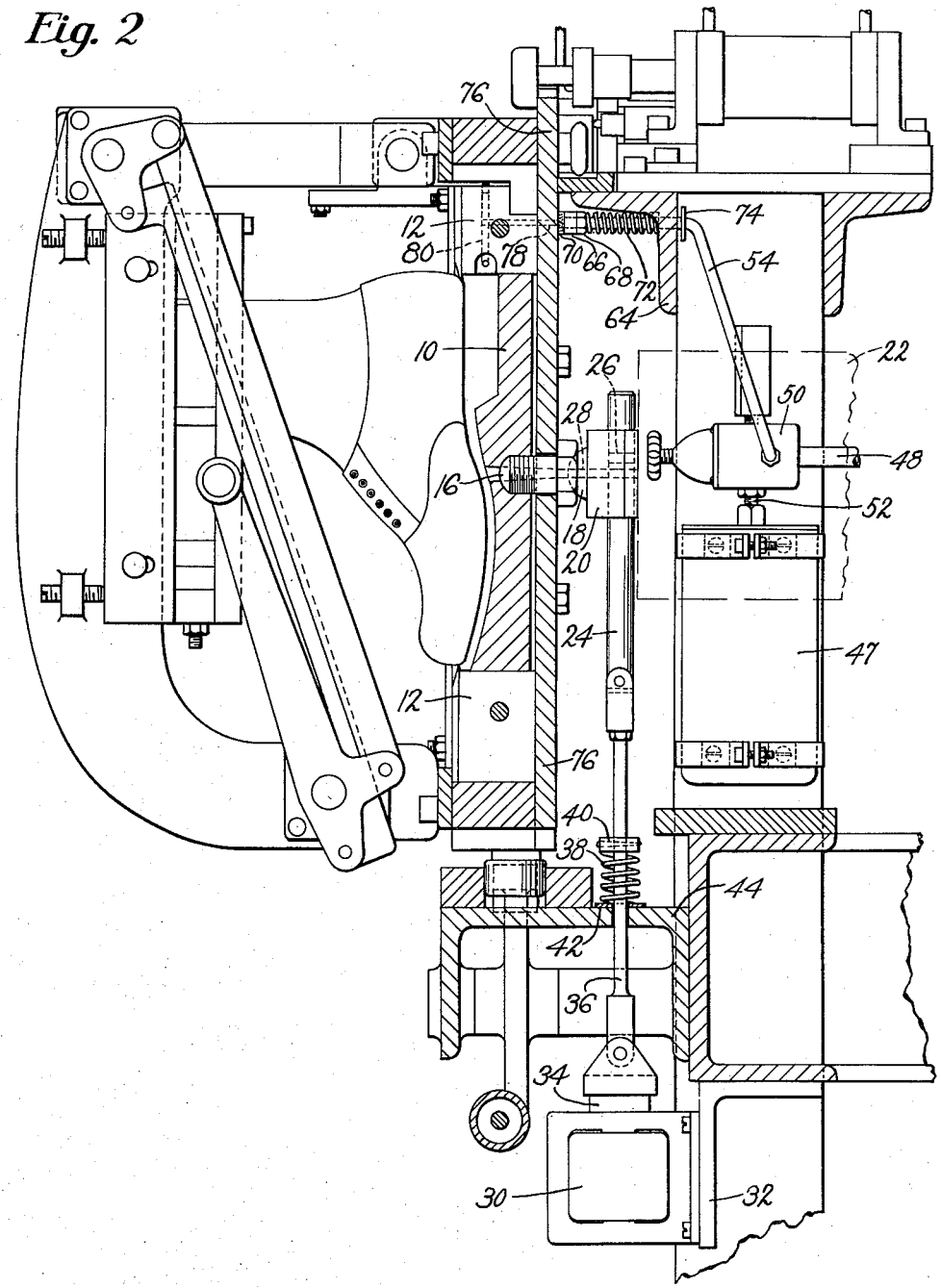
FIG. 2 is a section taken substantially on the line II—II of FIG. 1.

Referring to FIGS. 1 and 2, a sole mold member is identified by the numeral 10 and side mold members constructed and arranged to cooperate with the sole mold members are identified by numerals 12 and 14. As shown in FIG. 2, a headed sprue member 16 is mounted in the sole mold member 10 and arranged to engage a sprue nozzle 18. The nozzle is hemispherical in shape and seats in a complementally shaped cavity formed in the head of the sprue member 16. The nozzle extends forwardly from a block 20 at the forward end of an injection cylinder 22. Mounted in a bore in the block 20 for vertical sliding movement is a valve member herein illustrated as a cylindrical shaft 24 having formed therein a diametrical bore 26 which is arranged in alinement with a bore 28 in the nozzle 18 when the valve is in its open position and is upwardly offset from the bore 28 when the valve is in its closed position illustrated in FIG. 2. For moving the valve member 24 downwardly thereby to open the valve and permit the flow of fluid plastic from the injection cylinder 22 through the sprue nozzle 18 and into the mold cavity a solenoid 30 is secured to a fixed bracket 32, the armature 34 of the solenoid being connected to the shaft 24 by a link 36. For moving the shaft 24 upwardly into its closed position illustrated in FIG. 2, a compression spring 38 is arranged to surround the link 36 and is confined between a collar 40 fixed to the link and a washer 42 mounted on a frame member 44 which is bored to receive the link. The spring 38 operates immediately after the deenergizing of the solenoid 30 which occurs after the completion of the charging of the mold cavity.

In the illustrated organization the solenoid 30 is deenergized by the opening of a microswitch 46 contained within a fixed housing 47. The opening of the microswitch causes the opening of a relay (not shown) in the solenoid circuit. For opening the microswitch, a conduit 48 is connected to a source of compressed air through a regulating valve (not shown) which reduces the pressure in the conduit to a point only slightly greater than atmospheric pressure. The conduit 48 is connected to a junction box 50 mounted above the housing 47. A short length of tube 52 extends downwardly from the junction box through the upper wall of the housing and is connected to a bellows 56 mounted in the upper portion of the housing. Also connected to the junction box 50 is a tube 54 which is normally open to the atmosphere. As long as the tube 54 remains open to the atmosphere, air flowing into the junction box 50 through the conduit 48 flows out freely through the tube 54 and atmospheric pressure is maintained in the tube 52. When the flow of air through the tube 54 is obstructed, air pressure builds up in the tube 52 and the bellows 56 is inflated. The inflation of the bellows imparts downward movement to a plunger 58 which in turn exerts pressure on a button 60 to open the normally closed microswitch 46. When the air pressure in the bellows is relieved a spring 62 positioned between the bellows and a crosshead 63 collapses the bellows and a spring (not shown) incorporated in the microswitch closes the switch and returns the button 60 to its elevated position.

Figure 3:
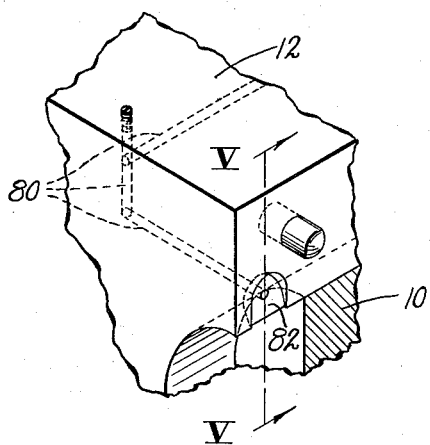
FIGS. 3 and 4 are angular views illustrating portions of the side mold members.
Figure 4:
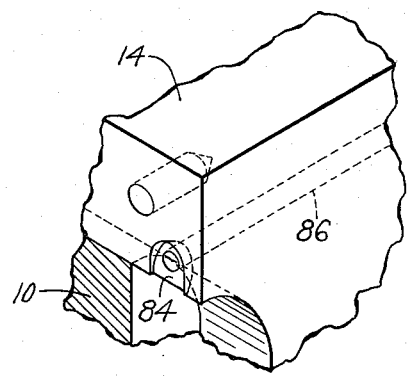
Figure 6:
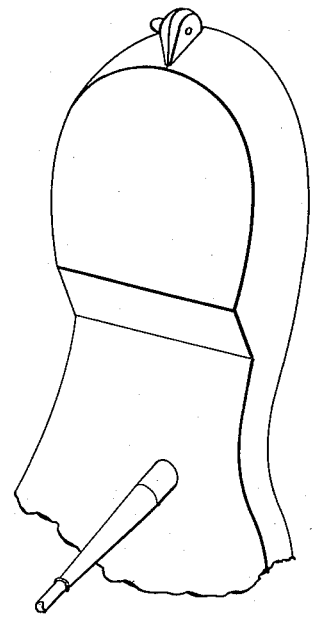
FIG. 6 is an angular view illustrating the heel and shank portion of a sole molded in the illustrated machine.
Figure 5:
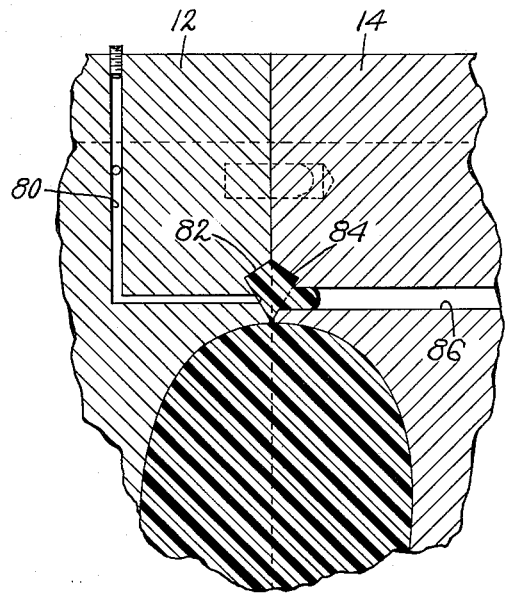
FIG. 5 is a sectional view showing portions of the side mold members in their closed position with the mold cavity completely filled with soling material, the section being taken on a plane identified by the line V—V in FIG. 3.

Referring to FIG. 2, the tube 54 has a horizontal end portion slidably mounted in a bore in a fixed bracket 64, the end portion of the tube being threaded to receive two nuts 66 and 68, and the nut 66 carries a resilient washer 70. The horizontal portion of the tube 54 is urged to the left, as seen in FIG. 2, by a spring 72 surrounding the tube and confined between the nut 68 and the bracket 64, such movement of the tube to the left being limited by the engagement of a collar 74 fixed to the tube with the bracket 64. The movement of the ambulatory assembly heightwise of a shoe on the shoe form into its position illustrated in FIG. 2 causes the engagement of a plate 76 on which the mold members are mounted with the resilient washer 70. With the ambulatory assembly in this position the conduit 54 is in communication with a bore 78 in the plate 76, said bore communicating with an angular conduit 80 formed in the side mold member 12. Referring to FIG. 3, the conduit 80 has an enlarged end portion herein illustrated as a cavity 82 formed in the parting face at the heel end of the side mold member 12. A similar cavity 84 formed in the side mold member 14 registers with the cavity 82 to form therewith a chamber when the side mold members are in their closed position illustrated in FIG. 5. A relatively large conduit 86 formed in the side mold member 14 communicates with the cavity 84 and at its opposite end is open to the atmosphere. With the side mold members in their closed position illustrated in FIG. 5, the bases of the cavities 82 and 84 converge toward the mold cavity and form at their forward ends a narrow slit providing a passage through which fluid plastic flows from the mold cavity into the chamber.

In the operation of the machine, after the mold cavity is fully charged, fluid plastic flows into the chamber provided by the cavities 82 and 84 and arrests the flow of air from the conduit 80 through the chamber and through the conduit 86 to the atmosphere and thus causes an increase in pressure in the conduit 48 (FIG. 1) sufficient to expand the bellows 56 and operate the plunger 58 to open the microswitch 46.

Having thus described our invention, what we claim as new and desire to secure by Letters Patent of the United States is:

In a plastic injection molding machine, means including two mold members constructed and arranged to form a mold cavity, said mold members being movable between a mold closing and a mold opening position and having mutually engaging parting faces, a nozzle through which fluid plastic is injected into the mold cavity, a gate valve for opening and closing the nozzle, means for closing the gate valve, a fluid pressure operated switch for causing the closing means to be operated, a fluid pressure line for causing the operation of said switch, a bleeder system communicating with the fluid pressure line and including an ingress conduit and an egress conduit formed in the mold members respectively and arranged for mutual registration at the parting faces of the mold members, said conduits being arranged to be interconnected by the movement of the mold members into mold closing position, said interconnecting conduits being enlarged at their interconnection to provide a chamber, and a passage formed between the parting faces of the two mold members and extending from the mold cavity to the chamber, through which passage fluid plastic flows from the mold cavity into the chamber thereby to obstruct the flow of fluid through the bleeder system and thus to cause a buildup of pressure in said fluid pressure line sufficient to operate said switch, said egress conduit being characterized by the fact that it is large enough in diameter to permit free flow of fluid plastic therethrough from the chamber.

References Cited in the file of this patent
UNITED STATES PATENTS

| | | |
|---|---|---|
| 932,268 | Gaudron | Aug. 24, 1909 |
| 2,832,095 | Ashley et al. | Apr. 29, 1958 |